US012654292B2

(12) United States Patent
Minor et al.

(10) Patent No.: US 12,654,292 B2
(45) Date of Patent: Jun. 16, 2026

(54) MULTI-NUT DRIVER

(71) Applicant: Klein Tools, Inc., Lincolnshire, IL (US)

(72) Inventors: Austin Minor, Aledo, TX (US); Jordan Fisher, Arlington, TX (US); Rafael Lopez, San Marcos, TX (US)

( * ) Notice: Subject to any disclaimer, the term of this patent is extended or adjusted under 35 U.S.C. 154(b) by 374 days.

(21) Appl. No.: 18/203,941

(22) Filed: May 31, 2023

(65) Prior Publication Data

US 2023/0390899 A1 Dec. 7, 2023

Related U.S. Application Data

(60) Provisional application No. 63/347,653, filed on Jun. 1, 2022.

(51) Int. Cl.
*B25B 23/00* (2006.01)
*B25B 13/10* (2006.01)

(52) U.S. Cl.
CPC ........ *B25B 23/0035* (2013.01); *B25B 13/102* (2013.01); *B25B 23/0007* (2013.01)

(58) Field of Classification Search
CPC ....... B25B 13/06; B25B 13/56; B25B 13/102; B25B 15/02; B25B 15/001; B25B 15/007; B25B 15/008; B25B 23/0007; B25B 23/0035; B25B 23/0042; B25G 1/04; B25G 1/06; B25G 1/08; B25G 1/085; B25G 1/043; B25F 1/02
See application file for complete search history.

(56) References Cited

U.S. PATENT DOCUMENTS

| | | | | |
|---|---|---|---|---|
| 3,187,610 A * | 6/1965 | Russman | B25B 13/102 | 81/185 |
| 5,894,765 A * | 4/1999 | Anderson | B25F 1/02 | 81/439 |
| 5,904,080 A * | 5/1999 | Anderson | B25F 1/02 | 81/439 |
| 12,251,799 B2 * | 3/2025 | Mangini | B25G 1/085 | |
| 2008/0041193 A1 * | 2/2008 | Baker | B25B 13/06 | 81/124.6 |
| 2014/0013905 A1 * | 1/2014 | Li | B25B 13/06 | 81/124.4 |
| 2019/0126445 A1 * | 5/2019 | Molina | B25G 1/063 | |
| 2023/0046586 A1 * | 2/2023 | Mangini | B25G 1/085 | |

* cited by examiner

*Primary Examiner* — Robert J Scruggs

(57) ABSTRACT

A pass-through hand tool includes a handle that includes a hollow bore extending therethrough. The pass-through tool includes a reversible main barrel, having a pair of socket ends and a hollow interior therebetween. The reversible main barrel is insertable into the hollow bore of the handle in either of two orientations to present one of the sockets. The pass-through tool includes a reversible secondary barrel having another pair of sockets and a hollow secondary interior therebetween. The reversible secondary barrel is insertable into the hollow interior of the reversible main barrel in either of two orientations to present one of the associated sockets. The pass-through hand tool includes a reversible tertiary barrel having another pair of sockets and a hollow tertiary interior therebetween. The reversible tertiary barrel is insertable into the hollow interior of the reversible secondary barrel in either of two orientations to present one of the associated sockets.

16 Claims, 11 Drawing Sheets

MULTI-NUT DRIVER

CROSS-REFERENCE TO RELATED APPLICATIONS

This patent application claims priority of U.S. Provisional Patent Application No. 63/347,653 filed on Jun. 1, 2022, the entire contents of which is herein incorporated by reference.

BACKGROUND OF THE DISCLOSURE

The present disclosure relates to nut drivers. More specifically, the present disclose related to a multi-nut driver designed to nut drivers of varying sizes within a nut driver handle. Repairmen, technicians, and others are frequently required to carry nut drivers of various sizes. Depending on the application, different sized nut drivers may be required. For example, 9/16, 3/8, 5/16, 1/4, and 3/16 inch sized nut drivers may be needed, and it may be undesirable for a user to carry multiple nut drivers in varying sizes.

In order to handle the various nuts that may be encountered, technicians are often required to carry a multitude of tools. Even though some nut driver sizes may be used infrequently, technicians still may need to carry all the potential sizes for the screws and nuts that they may encounter, along with other tools necessary for their work. It may be difficult and time-consuming for them to gather the separate tools that may be needed. It may also be unwieldy and cumbersome to carry the multiple tools that may be required. Additionally, it is often costly for a technician to purchase the various tools that may be required. Multi-nut drivers are designed allow a technician to drive nuts of varying sizes with a single tool.

BRIEF SUMMARY OF THE DISCLOSURE

In accordance with one feature of this disclosure, a pass-through multi-nut driver is provided and includes a handle having a first opening at a first end and a second opening at a second end opposite the first end. The first opening comprises a handle socket opening. The driver includes a reversible main barrel having a first socket end, a second socket end, and a first engagement portion therebetween. The driver includes a first reversable secondary barrel having a third socket end, a fourth socket end, and a second engagement portion therebetween. The driver includes a second reversable secondary barrel having a fifth socket end, a sixth socket end, and a third engagement portion therebetween. The driver includes a reversible tertiary barrel having a seventh socket end, an eighth socket end, and a fourth engagement portion therebetween. The handle socket opening is configured to allow a portion of the main barrel to pass through the handle socket opening and engage the first engagement portion. The first socket end is configured to allow a portion of the first reversible secondary barrel to pass through the first socket end and engage the second engagement portion. The second socket end is configured to allow a portion of the second reversible secondary barrel to pass through the second socket end and engage the third engagement portion. The third socket end is configured to allow a portion of the tertiary barrel to pass through the third socket end and engage the fourth engagement portion. Each of the socket ends are configured to engage a bolt head or nut of a size that is different than each of the other socket ends. The handle, reversible main barrel, first reversible secondary barrel, second reversible secondary barrel, and tertiary barrel each have a pass-through interior, and when assembled, form a continuous chamber passing through the length of the tool.

In one feature, the handle socket opening is a 3/4" hex socket shaped to engage a bolt head having a hexagonal profile.

According to another feature, the first engagement portion comprises an exterior groove facing outwardly from the main barrel, the handle comprises a collet having a detent mechanism, and the detent mechanism, when the main barrel is inserted into the handle, engages the exterior groove to resist removal of the main barrel from the handle.

As one feature, the first engagement portion comprises a first exterior groove facing outwardly from the main barrel adjacent the first socket end and a second exterior groove facing outwardly from the main barrel adjacent the second socket end.

The handle comprises a collet having a detent mechanism engageable to the first exterior groove or the second exterior groove to resist removal of the main barrel from the handle.

According to one feature, the first socket end is a 1/2" socket, the second socket end is a 9/16" socket, the third socket end is a 3/8" socket, the fourth socket end is a 7/16" socket, the fifth socket end is a 11/32" socket, the sixth socket end is a 5/16" socket, the seventh socket end is a 1/4" socket, and the eighth socket end is a 3/16" socket.

In accordance with one feature, each of the first socket end, second socket end, third socket end, fourth socket end, fifth socket end, sixth socket end, seventh socket end, and the eighth socket end are a hex socket.

In accordance with one feature of this disclosure, a pass-through hand tool is provided and includes a handle having a body portion that includes a hollow bore that extends completely through the handle along a longitudinal axis. The pass-through hand tool includes a reversible main barrel, having a first socket at a first end and a second socket at a second end, and a hollow interior between the first socket and the second socket. The reversible main barrel is insertable into the hollow bore of the body portion of the handle in either of two orientations to present the first socket or the second socket. The pass-through hand tool includes a reversible secondary barrel, having a third socket at a first secondary barrel end and a fourth socket at a second secondary barrel end, and a hollow secondary interior between the third socket and the fourth socket. The reversible secondary barrel is insertable into the hollow interior of the reversible main barrel in either of two orientations to present the third socket or the fourth socket. The pass-through hand tool includes a reversible tertiary barrel, having a fifth socket at a first tertiary barrel end and a sixth socket at a second tertiary barrel end, and a hollow tertiary interior between the fifth socket and the sixth socket. The reversible tertiary barrel is insertable into the hollow interior of the reversible secondary barrel in either of two orientations to present the fifth socket or the sixth socket.

In one feature, the pass-through hand tool includes a second reversible secondary barrel, having a seventh socket at one end and a eighth socket at an opposite end, and a second hollow secondary interior between the seventh socket and the eighth socket. The second reversible secondary barrel is insertable into the hollow interior of the reversible main barrel in either of two orientations to present the seventh socket or the eighth socket.

According to another feature, the first socket is a 1/2" hex socket, the second socket is a 9/16" hex socket, the third socket is a 11/32" hex socket, the fourth socket is a 5/16" hex socket, the fifth socket is a 1/4" hex socket, the sixth socket is a 3/16" hex socket, the seventh socket is a 3/8" hex socket, and the eighth socket is a 7/16" hex socket.

As one feature, the pass-through hand tool includes a detent mechanism engaged between the hollow bore and the reversible main barrel to resist removal of the reversible main barrel from the hollow bore.

In one feature, the pass-through hand tool includes a detent mechanism engaged between the hollow interior and the reversible secondary barrel to resist removal of the reversible secondary barrel from the hollow interior.

According to one feature, the handle includes a seventh socket at one end of the hollow bore.

In accordance with one feature, when the reversible main barrel is inserted into the hollow bore, the reversible secondary barrel is inserted into the hollow interior, and reversible tertiary barrel is inserted into the hollow secondary interior, the hollow bore, hollow interior, hollow secondary interior, and the hollow tertiary interior form a continuous interior space along an entire length of the pass-through hand tool.

According to another feature, the continuous interior space allows a rod to pass through the entire length of the pass-through hand tool.

As one feature, the reversible main barrel further includes a wrench assist.

In accordance with one feature of this disclosure, a pass-through hand tool is provided and includes a handle having a body portion that includes a hollow bore that extends completely through the handle along a longitudinal axis. The pass-through hand tool includes a reversible main barrel, having a first socket at a first end and a second socket at a second end, and a hollow interior between the first socket and the second socket. The reversible main barrel is insertable into the hollow bore of the body portion of the handle in either of two orientations to present the first socket or the second socket. The pass-through hand tool includes a reversible secondary barrel, having a third socket at a first secondary barrel end and a fourth socket at a second secondary barrel end, and a hollow secondary interior between the third socket and the fourth socket. The reversible secondary barrel is insertable into the hollow interior of the reversible main barrel in either of two orientations to present the third socket or the fourth socket.

In one feature the pass-through hand tool includes a reversible tertiary barrel, having a fifth socket at a first tertiary barrel end and a sixth socket at a second tertiary barrel end, and a hollow tertiary interior between the fifth socket and the sixth socket. The reversible tertiary barrel is insertable into the hollow interior of the reversible secondary barrel in either of two orientations to present the fifth socket or the sixth socket.

According to one feature, the pass-through hand tool includes a second reversible secondary barrel, having a seventh socket at one end and a eighth socket at an opposite end, and a second hollow secondary interior between the seventh socket and the eighth socket. The second reversible secondary barrel is insertable into the hollow interior of the reversible main barrel in either of two orientations to present the seventh socket or the eighth socket.

As one feature, when the reversible main barrel is inserted into the hollow bore, the reversible secondary barrel is inserted into the hollow interior, and reversible tertiary barrel is inserted into the hollow secondary interior, the hollow bore, hollow interior, hollow secondary interior, and the hollow tertiary interior form a continuous interior space along an entire length of the pass-through hand tool. The continuous interior space allows a rod to pass through the entire length of the pass-through hand tool.

In another feature, the first socket is a 1/2" hex socket, the second socket is a 9/16" hex socket, the third socket is a 11/32" hex socket, the fourth socket is a 5/1" hex socket, the fifth socket is a 1/4" hex socket, the sixth socket is a 3/16" hex socket, the seventh socket is a 3/8" hex socket, and the eighth socket is a 7/16" hex socket.

It should be understood that the inventive concepts disclosed herein do not require each of the features discussed above, may include any combination of the features discussed, and may include features not specifically discussed above.

DETAILED DESCRIPTION OF PREFERRED EMBODIMENTS

Figure 1:
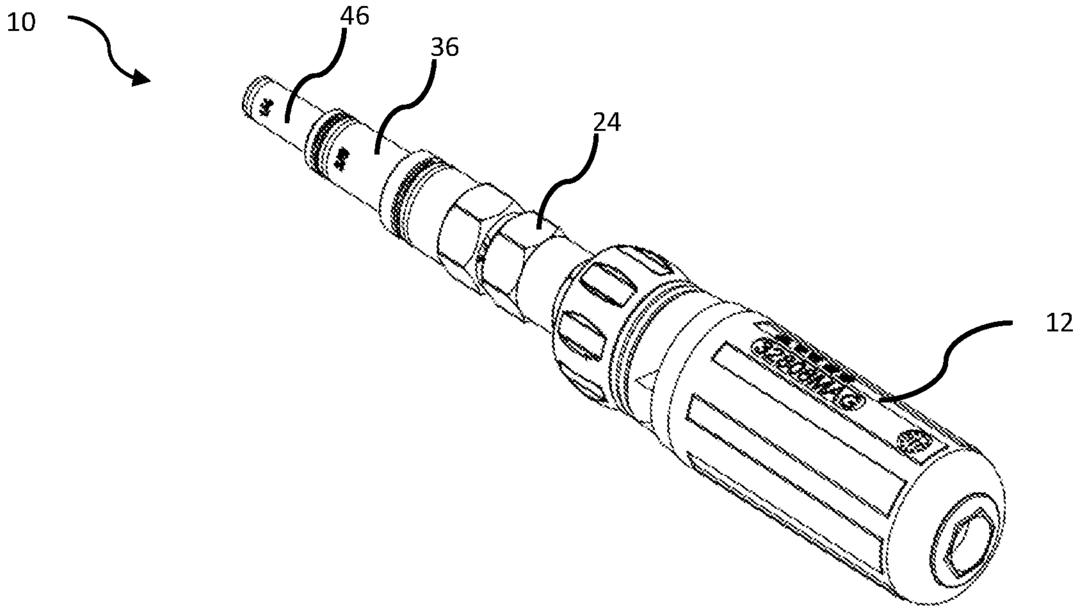
FIG. 1 is a perspective view of a multi-bit driver.

As best seen in FIG. 1, a nut driver 10 (e.g., driver) is provided. In the illustrated and preferred embodiment, the nut driver 10 is a multi-nut driver having a plurality of socket ends (e.g., hex socket openings) of varying sizes, for example, to drive bolts and/or nuts having heads of varying sizes. As best shown in FIGS. 2A-3B, the nut driver 10 includes a handle 12. The handle 12 has an elongated grip portion 14. In the illustrated and preferred embodiment, the grip portion 14 includes an open interior 16, an opening 18 at a first end, and a collet 20 at a second end opposite the first end. As best shown in FIG. 3B, in the illustrated and preferred embodiment, the open interior 16 passes through the entirety of the handle 12 from the opening 18 to the collet 20.

In the illustrated and preferred embodiment, the collet 20 is press fit into the handle 12. As best shown in FIG. 3B, the collet 20 has a first hex socket opening 22 sized to engage a hexagonal profile of a first size (e.g., a nut, bolt, etc. having a hexagonal head). In the illustrated and preferred embodiment, the first hex socket opening 22 is a 3/4 inch hex socket opening.

In the illustrated and preferred embodiment, the handle 12 of the nut driver 10 is configured to removably receive a main barrel 24. In the illustrated and preferred embodiment, the main barrel 24 is a reversable socket (e.g., flip socket, reversable flip socket, double hex socket). The main barrel 24 includes a first main barrel socket 26 at one end and a second main barrel socket 28 at an opposite end. In the illustrated and preferred embodiment, the first main barrel socket 26 is a hex socket sized to engage a hexagonal profile of a second size and the second main barrel socket 28 is a hex socket sized to engage a hexagonal profile of a third size. The main barrel 24 is reversable to allow a user to adjust nuts, bolts, etc. having a hexagonal head corresponding to the second size or the third size. In the illustrated and preferred embodiment, the main barrel 24 has an open (e.g., hollow, pass-through) interior between the first main barrel socket 26 and the second main barrel socket 28.

In the illustrated and preferred embodiment, the main barrel 24 has a pair of exterior grooves 30 facing outwardly from the main barrel 24, and the collet 20 includes at least one ball detent 32 configured to engage one of the grooves 30. In the illustrated and preferred embodiment, each ball detent 32 has a detent spring configured to retain the ball. The main barrel 24 is configured to slide into the handle 12 such that a portion of the main barrel 24 is retained within the handle 12 via the ball detent 32 engaging one of the grooves 30. In the illustrated and preferred embodiment, a user may insert the first main barrel socket 26 into the handle 12 to use the second main barrel socket 28 or insert the second main barrel socket 28 into the handle 12 to use the first main barrel socket 26.

Figure 2A:
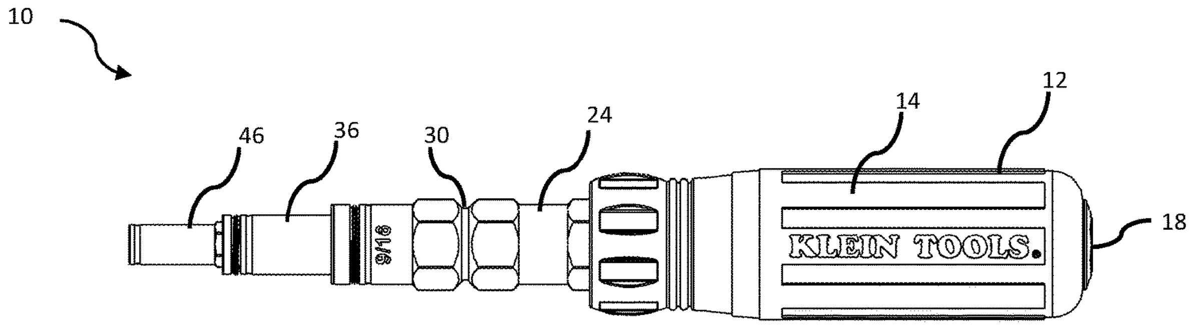
FIG. 2A is a side view of the multi-bit driver shown in FIG. 1.
Figure 2B:
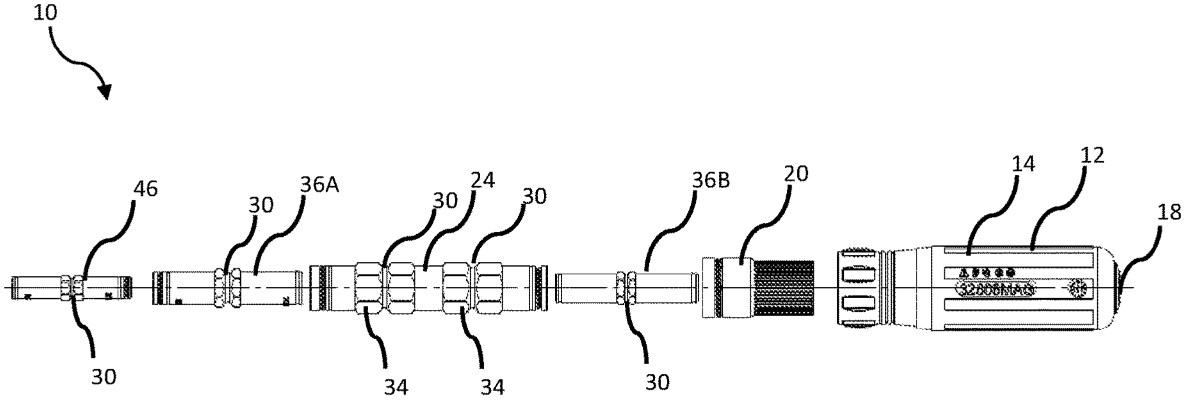
FIG. 2B is a disassembled side view of the multi-bit driver shown in FIG. 1.

As best shown in FIG. 2B, in the illustrated and preferred embodiment, the main barrel 24 includes a hexagonal wrench assist 34. A user, for example, may engage the wrench assist 34 with a wrench to apply torque to the main barrel 24 in additional to torque supplied by the user through the handle 12.

In the illustrated and preferred embodiment, the main barrel 24 is configured to removably receive at least one secondary barrel 36. The nut driver 10 of the illustrated and preferred embodiment has a first secondary barrel 36A and a second secondary barrel 36B. In the illustrated and preferred embodiment, the first secondary barrel 36A and the second secondary barrel 36B (e.g., secondary barrels 36) are reversable sockets (e.g., flip sockets, reversable flip sockets, double hex sockets). Each secondary barrel 36 has an associated first secondary barrel socket 38 at one end and a second secondary barrel socket 40 at an opposite end. In the illustrated and preferred embodiment, the first secondary barrel socket 38 of the first secondary barrel 36A is a hex socket sized to engage a hexagonal profile of a fourth size and the second secondary barrel socket 40 of the first secondary barrel 36A is a hex socket sized to engage a hexagonal profile of a fifth size. In the illustrated and preferred embodiment, the first secondary barrel socket 38 of the second secondary barrel 36B is a hex socket sized to engage a hexagonal profile of a sixth size and the second secondary barrel socket 40 of the second secondary barrel 36B is a hex socket sized to engage a hexagonal profile of a seventh size.

In the illustrated and preferred embodiment, the secondary barrels 36 are reversable to allow a user to adjust nuts, bolts, etc. having a hexagonal head corresponding to the fourth, fifth, sixth, or seventh size. In the illustrated and preferred embodiment, the secondary barrels 36 each comprises an open (e.g., hollow) interior between the associated first secondary barrel socket 38 and the second secondary barrel socket 40.

Figure 3A:
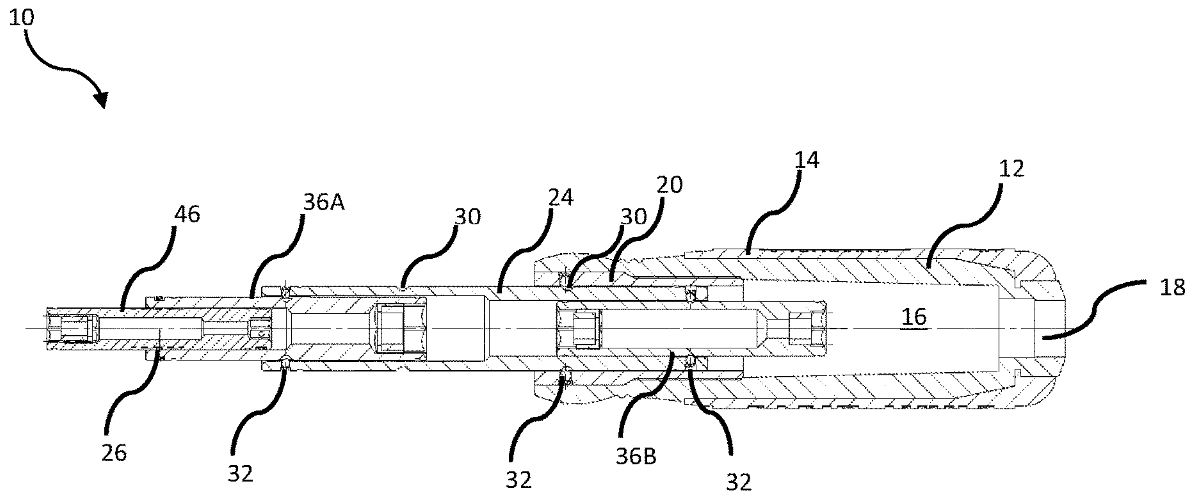
FIG. 3A is cross-sectional view of the multi-bit driver shown in FIG. 2A.
Figure 3B:
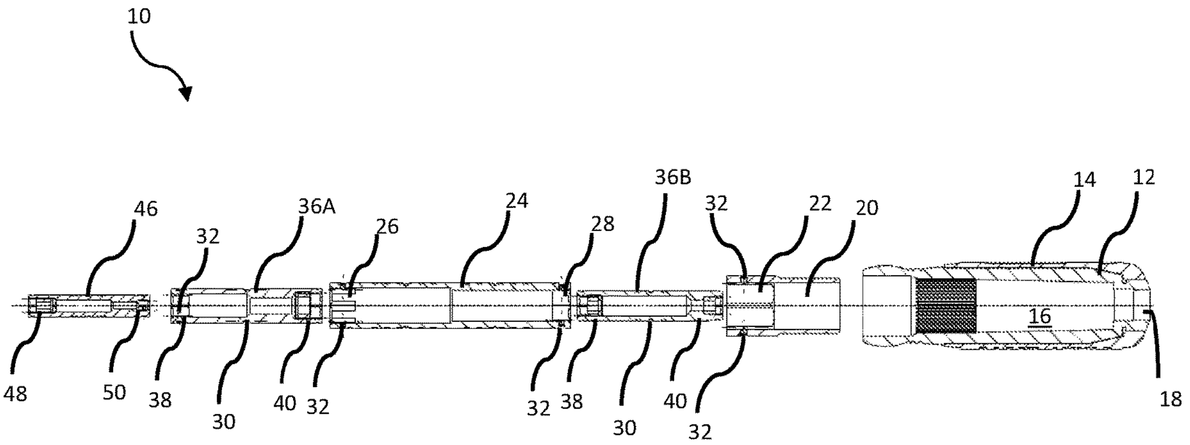
FIG. 3B is cross-sectional view of the disassembled multi-bit driver shown in FIG. 2B.
Figure 4:
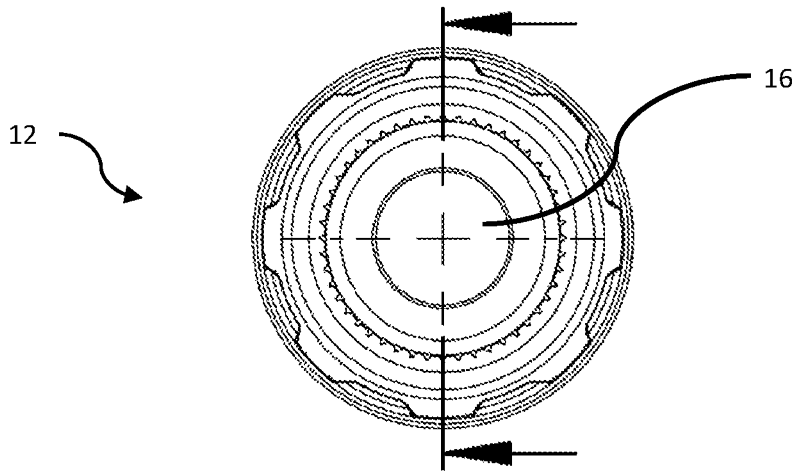
FIG. 4 is an end view of the handle shown in FIG. 5A.
Figure 5:
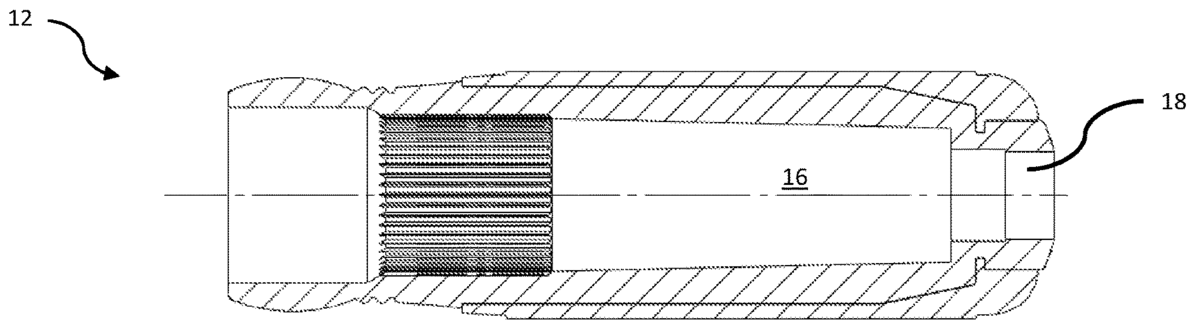
FIG. 5 is cross-sectional view of the handle shown in FIG. 4.
Figure 6:
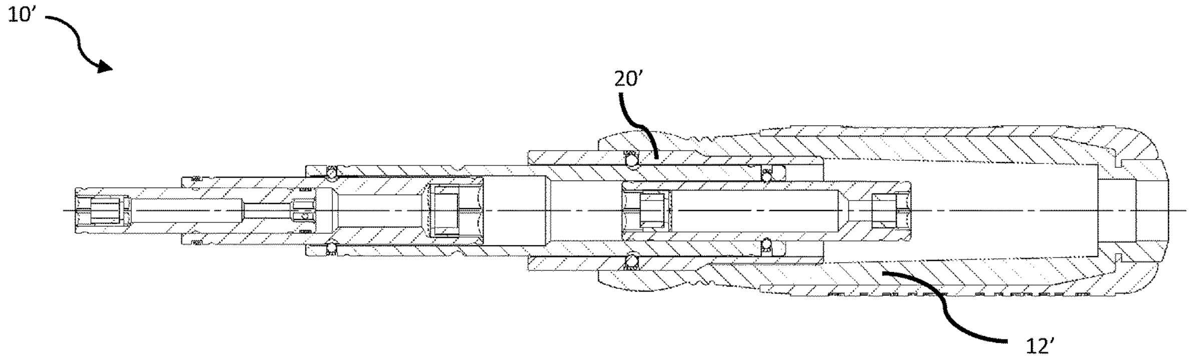
FIG. 6 is a cross-sectional view of another embodiment of a multi-bit driver.
Figure 7:
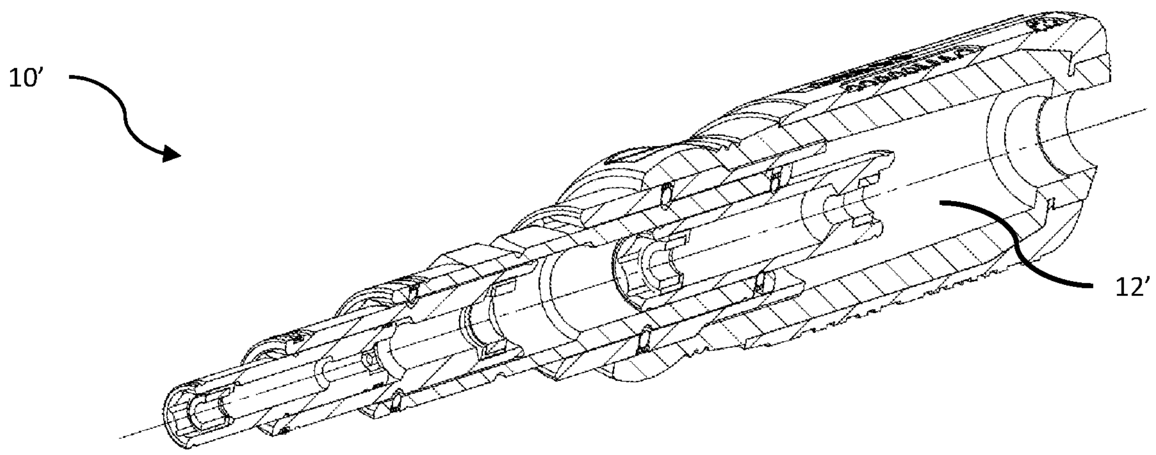
FIG. 7 is a is a perspective cross-sectional view of the multi-bit driver shown in FIG. 6.
Figure 8:
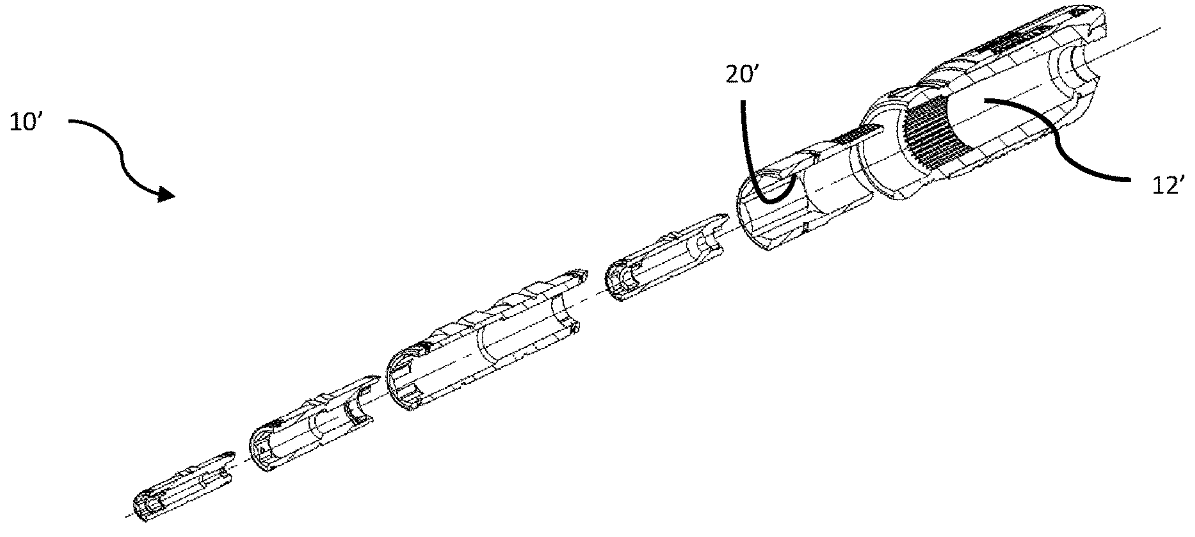
FIG. 8 is a is a disassembled perspective cross-sectional view of the multi-bit driver shown in FIG. 6.
Figure 9:
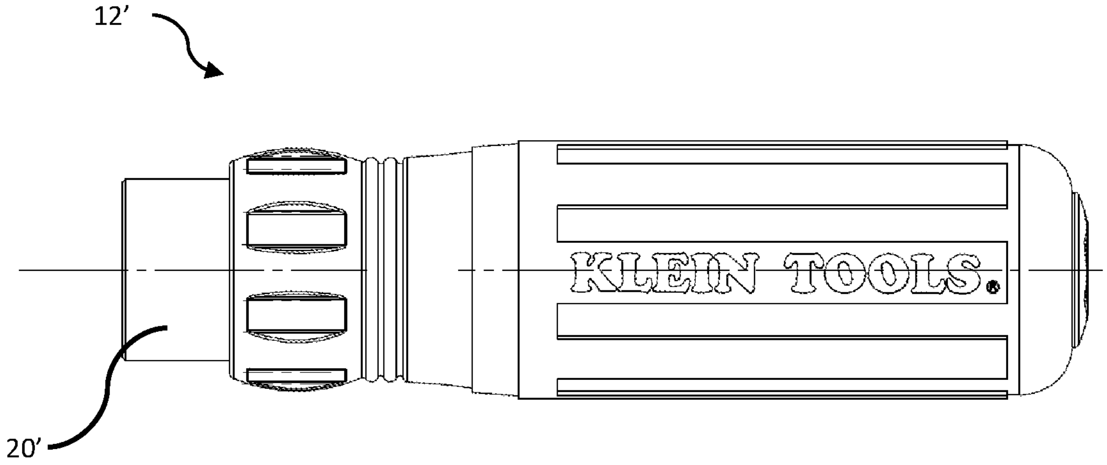
FIG. 9 is a side view of a handle of the multi-bit driver shown in FIG. 6.

In the illustrated and preferred embodiment, the secondary barrels 36 each have an exterior groove 30 facing outwardly from the associated secondary barrel 36. In the illustrated and preferred embodiment, the first main barrel socket 26 of the main barrel 24 has at least one ball detent 32 and the second main barrel socket 28 of the main barrel 24 has at least one ball detent 32. Each ball detent 32 of the main barrel 26 is configured to engage the groove 30 of the first secondary barrel 36A or the second secondary barrel 36B. Each secondary barrel 36 may slide into the main barrel 24 such that a portion of each secondary barrel 36 is retained within the main barrel 24 via the ball detent 32 of the main barrel 24 engaging grooves 30 of the secondary barrels 36. In the illustrated and preferred embodiment, a user may insert the first main barrel socket 26 into the handle 12 to use the second main barrel socket 28 or insert the second main barrel socket 28 into the handle 12 to use the first main barrel socket 26. In the illustrated and preferred embodiment, the user may insert the first secondary barrel 36A into, for example, the first main barrel socket 26 to use the first secondary barrel socket 38 or the second secondary barrel socket 40. In the illustrated and preferred embodiment, in such a configuration, the first main barrel socket 28 is positioned within the handle 12 and the second secondary barrel 36B, is retained by the first main barrel socket 28 within the handle 12, as best shown in FIG. 3A. To use the first secondary barrel socket 38 or the second secondary barrel socket 40 of the second secondary barrel 36B, a user may remove the main barrel 24 from the handle 12 and insert the first main barrel socket 26 retaining the first secondary barrel 36A into the handle and exposing the second secondary barrel 36B.

In the illustrated and preferred embodiment, the first secondary barrel 36A is configured to removably receive a tertiary barrel 46. In the illustrated and preferred embodiment, the tertiary barrel is a reversable socket (e.g., flip socket, reversable flip socket, double hex socket). The tertiary barrel 46 has a first tertiary barrel socket 48 at one end and a second tertiary barrel socket 50 at an opposite end. In the illustrated and preferred embodiment, the first tertiary barrel socket 48 is a hex socket sized to engage a hexagonal profile of an eighth size and the second tertiary barrel socket 50 is a hex socket sized to engage a hexagonal profile of a ninth size.

In the illustrated and preferred embodiment, the tertiary barrel 46 is reversable to allow a user to adjust nuts, bolts, etc. having a hexagonal head corresponding to the eighth or ninth sizes. In the illustrated and preferred embodiment, the tertiary barrel 46 has an open (e.g., hollow) interior between the first tertiary barrel socket 48 and the second secondary barrel socket 50.

In the illustrated and preferred embodiment, the tertiary barrel 48 has an exterior groove 30 facing outwardly from the tertiary barrel 48. In the illustrated and preferred embodiment, the first secondary barrel 36A includes at least one ball detent 32. The tertiary barrel 46 is configured to slide into the main barrel 24 in two configurations such that a portion of the tertiary barrel 46 is retained within first secondary barrel 36A via the ball detent 32 of the first secondary barrel 36A engaging the groove 30 of the tertiary barrel 46. In one such configuration, the first tertiary barrel socket 48 is retained within the first secondary barrel 36A with the second tertiary barrel socket 50 extending outwardly to engage a corresponding hexagonal profile of the eighth size. In another configuration, the second tertiary barrel socket 50 is retained within the first secondary barrel 36A with the first tertiary barrel socket 48 extending outwardly to engage a corresponding hexagonal profile of the ninth size.

In the illustrated and preferred embodiment, each of the handle 12, the main barrel 24, the secondary barrels 36, and the tertiary barrel 46 have pass through interiors such that when assembled, the handle 12, the main barrel 24, the secondary barrels 36, and the tertiary barrel 46 form a continuous chamber (e.g., form a common cavity) passing through the length of the nut driver 10. In the illustrated and preferred embodiment, for example, the nut driver 10 may engage a nut with a threaded rod passing through the length of the nut driver 10 (e.g., the handle 12, the main barrel 24, the secondary barrels 36, and/or the tertiary barrel 46) to thread the nut along the threaded rod.

In the illustrated and preferred embodiment, the first hex socket opening 22, first main barrel socket 26, second main barrel socket 28, first secondary barrel sockets 38, second secondary barrel sockets 40, first tertiary barrel socket 48, and second tertiary barrel socket 50 each include a magnet, for example, to allow for the sockets to magnetically retain a nut, bolt, etc. In some examples, magnets may be press fit into the sockets. In some examples, the sockets may have a copper sleeve to retain magnets. In some examples, the magnets may be glued.

In the illustrated and preferred embodiment, the first size is ¾ inches. In the illustrated and preferred embodiment, the second size is ½ inches. In the illustrated and preferred embodiment, the third size is 9⁄16 inches. In the illustrated and preferred embodiment, the fourth size is ⅜ inches. In the illustrated and preferred embodiment, the fifth size is 7⁄16 inches. In the illustrated and preferred embodiment, the sixth size is 11⁄32 inches. In the illustrated and preferred embodiment, the seventh size is 5⁄16 inches. In the illustrated and preferred embodiment, the eighth size is ¼ inches. In the illustrated and preferred embodiment, the ninth size is 3⁄16 inches.

FIGS. 6-9 show an alternate embodiment of a nut driver 10'. The nut driver 10' has a handle 12' with a collet 20' that configured to extend outwardly from the handle 12'. The collet 20' includes a smooth exterior profile, for example, to allow the nut driver 10' to rotate freely in a tight location. In the illustrated and preferred embodiment, the collet 20' has a circular exterior profile.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the flip socket set 10 are shown in the figures, it should be understood that this disclosure anticipates variations in the specific details of each of the disclosed components and features of the material dispenser and that no limitation to a specific form, configuration, or detail is intended unless expressly and specifically recited in an appended claim.

As another example, while the first hex socket opening 22, first main barrel socket 26, second main barrel socket 28, first secondary barrel sockets 38, second secondary barrel sockets 40, first tertiary barrel socket 48, and second tertiary barrel socket 50 different sizes, in some examples they may be the same size. In some examples, different sized sockets, including metric sizes, may be used.

While the first hex socket opening 22, first main barrel socket 26, second main barrel socket 28, first secondary barrel sockets 38, second secondary barrel sockets 40, first tertiary barrel socket 48, and second tertiary barrel socket 50 are shown in a hexagonal form configured to drive threaded fasteners having hexagonal heads, any shaped socket end may be used to drive threaded fasteners having other shapes.

While the collet 20 is shown as being press fit into the handle 12, in some examples, the collet 20 may be molded into the handled 12 or be of singular construction.

In a further example, while the nut driver 10 is shown as forming a common cavity to allow a threated rod to pass therethrough, in some examples, the one or more of the barrels, such as for example, the tertiary barrel 46 may not be a pass through barrel.

As another example, while the nut driver 10 is shown using ball detents 32 and grooves 30, in some examples, the nut driver 10 may not use ball detents 32 and grooves 30. Other forms of releasable engagement, for example, friction fitting or magnets may be used.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

What is claimed is:

1. A pass-through multi-nut driver comprising:

a handle having a first opening at a first end and a second opening at a second end opposite the first end, wherein the first opening comprises a handle socket opening;

a reversible main barrel having a first socket end, a second socket end, and a first engagement portion therebetween;

a first reversable secondary barrel having a third socket end, a fourth socket end, and a second engagement portion therebetween;

a second reversable secondary barrel having a fifth socket end, a sixth socket end, and a third engagement portion therebetween; and a reversible tertiary barrel having a seventh socket end, an eighth socket end, and a fourth engagement portion therebetween;

wherein the handle socket opening is configured to:

allow a portion of the main barrel to pass through the handle socket opening and engage the first engagement portion;

wherein the first socket end is configured to:

allow a portion of the first reversible secondary barrel to pass through the first socket end and engage the second engagement portion;

wherein the second socket end is configured to:

allow a portion of the second reversible secondary barrel to pass through the second socket end and engage the third engagement portion;

wherein the third socket end is configured to:

allow a portion of the tertiary barrel to pass through the third socket end and engage the fourth engagement portion;

wherein each of the socket ends are configured to engage a bolt head or nut of a size that is different than each of the other socket ends; and wherein the handle, reversible main barrel, first reversible secondary barrel, second reversible secondary barrel, and tertiary barrel each have a pass-through interior, and when assembled, form a continuous chamber passing through the length of the tool.

2. The pass-through multi-nut driver of claim 1, wherein the handle socket opening is a ¾" hex socket shaped to engage a bolt head having a hexagonal profile.

3. The pass-through multi-nut driver of claim 1, wherein:

the first engagement portion comprises an exterior groove facing outwardly from the main barrel;

the handle comprises a collet having a detent mechanism; and the detent mechanism, when the main barrel is inserted into the handle, engages the exterior groove to resist removal of the main barrel from the handle.

4. The pass-through multi-nut driver of claim 1, wherein:

the first engagement portion comprises a first exterior groove facing outwardly from the main barrel adjacent the first socket end and a second exterior groove facing outwardly from the main barrel adjacent the second socket end; and the handle comprises a collet having a detent mechanism engageable to the first exterior groove or the second exterior groove to resist removal of the main barrel from the handle.

5. The pass-through multi-nut driver of claim 1, wherein the first socket end is a ½" socket, the second socket end is a 9/16" socket, the third socket end is a ⅜" socket, the fourth socket end is a 7/16" socket, the fifth socket end is a 11/32" socket, the sixth socket end is a 5/16" socket, the seventh socket end is a ¼" socket, and the eighth socket end is a 3/16" socket.

6. The pass-through multi-nut driver of claim 1, wherein each of the first socket end, second socket end, third socket end, fourth socket end, fifth socket end, sixth socket end, seventh socket end, and the eighth socket end are a hex socket.

7. A pass-through hand tool comprising:

a handle having a body portion that includes a hollow bore that extends completely through the handle along a longitudinal axis;

a reversible main barrel, having a first socket at a first end and a second socket at a second end, and a hollow interior between the first socket and the second socket, wherein the reversible main barrel is insertable into the hollow bore of the body portion of the handle in either of two orientations to present the first socket or the second socket;

a reversible secondary barrel, having a third socket at a first secondary barrel end and a fourth socket at a second secondary barrel end, and a hollow secondary interior between the third socket and the fourth socket, wherein the reversible secondary barrel is insertable into the hollow interior of the reversible main barrel in either of two orientations to present the third socket or the fourth socket; and a reversible tertiary barrel, having a fifth socket at a first tertiary barrel end and a sixth socket at a second tertiary barrel end, and a hollow tertiary interior between the fifth socket and the sixth socket, wherein the reversible tertiary barrel is insertable into the hollow interior of the reversible secondary barrel in either of two orientations to present the fifth socket or the sixth socket; and wherein, when the reversible main barrel is inserted into the hollow bore, the reversible secondary barrel is inserted into the hollow interior, and reversible tertiary barrel is inserted into the hollow secondary interior, the hollow bore, hollow interior, hollow secondary interior, and the hollow tertiary interior form a continuous interior space along an entire length of the pass-through hand tool.

8. The pass-through hand tool of claim 7, further comprising a second reversible secondary barrel, having a seventh socket at one end and a eighth socket at an opposite end, and a second hollow secondary interior between the seventh socket and the eighth socket, wherein the second reversible secondary barrel is insertable into the hollow interior of the reversible main barrel in either of two orientations to present the seventh socket or the eighth socket.

9. The pass-through hand tool of claim 8, wherein the first socket is a ½" hex socket, the second socket is a 9/16" hex socket, the third socket is a 11/32" hex socket, the fourth socket is a 5/16" hex socket, the fifth socket is a ¼" hex socket, the sixth socket is a 3/16" hex socket, the seventh socket is a ⅜" hex socket, and the eighth socket is a 7/16" hex socket.

10. The pass-through hand tool of claim 7, further comprising a detent mechanism engaged between the hollow bore and the reversible main barrel to resist removal of the reversible main barrel from the hollow bore.

11. The pass-through hand tool of claim 7, further comprising a detent mechanism engaged between the hollow interior and the reversible secondary barrel to resist removal of the reversible secondary barrel from the hollow interior.

12. The pass-through hand tool of claim 7, wherein the handle further includes a seventh socket at one end of the hollow bore.

13. The pass-through hand tool of claim 7, wherein the continuous interior space allows a rod to pass through the entire length of the pass-through hand tool.

14. The pass-through hand tool of claim 7, wherein the reversible main barrel further includes a wrench assist comprising a pair of outwardly facing planar surfaces.

15. A pass-through hand tool comprising:

a handle having a body portion that includes a hollow bore that extends completely through the handle along a longitudinal axis;

a reversible main barrel, having a first socket at a first end and a second socket at a second end, and a hollow interior between the first socket and the second socket, wherein the reversible main barrel is insertable into the hollow bore of the body portion of the handle in either of two orientations to present the first socket or the second socket;

a reversible secondary barrel, having a third socket at a first secondary barrel end and a fourth socket at a second secondary barrel end, and a hollow secondary interior between the third socket and the fourth socket, wherein the reversible secondary barrel is insertable into the hollow interior of the reversible main barrel in either of two orientations to present the third socket or the fourth socket;

a reversible tertiary barrel, having a fifth socket at a first tertiary barrel end and a sixth socket at a second tertiary barrel end, and a hollow tertiary interior between the fifth socket and the sixth socket, wherein the reversible tertiary barrel is insertable into the hollow interior of the reversible secondary barrel in either of two orientations to present the fifth socket or the sixth socket; and a second reversible secondary barrel, having a seventh socket at one end and a eighth socket at an opposite end, and a second hollow secondary interior between the seventh socket and the eighth socket, wherein the second reversible secondary barrel is insertable into the hollow interior of the reversible main barrel in either of two orientations to present the seventh socket or the eighth socket; and wherein:

when the reversible main barrel is inserted into the hollow bore, the reversible secondary barrel is inserted into the hollow interior, and reversible tertiary barrel is inserted into the hollow secondary interior, the hollow bore, hollow interior, hollow secondary interior, and the hollow tertiary interior form a continuous interior space along an entire length of the pass-through hand tool; and the continuous interior space allows a rod to pass through the entire length of the pass-through hand tool.

16. The pass-through hand tool of claim 15, wherein the first socket is a ½" hex socket, the second socket is a 9⁄16" hex socket, the third socket is a 11⁄32" hex socket, the fourth socket is a 5⁄16" hex socket, the fifth socket is a ¼" hex socket, the sixth socket is a 3⁄16" hex socket, the seventh socket is a ⅜" hex socket, and the eighth socket is a 7⁄16" hex socket.

* * * * *